(12) United States Patent
Brink et al.

(10) Patent No.: US 7,606,954 B2
(45) Date of Patent: Oct. 20, 2009

(54) DATA STORAGE USING COMPRESSION

(75) Inventors: Peter C. Brink, Tempe, AZ (US); Paul S. Levy, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 374 days.

(21) Appl. No.: 11/239,774

(22) Filed: Sep. 29, 2005

(65) Prior Publication Data
US 2007/0073941 A1    Mar. 29, 2007

(51) Int. Cl.
*G06F 13/00* (2006.01)
*G06F 5/00* (2006.01)
*G06F 13/12* (2006.01)

(52) U.S. Cl. .................. 710/68; 710/33; 710/52; 710/74

(58) Field of Classification Search ............ 710/1, 710/33, 52, 62, 68, 72, 74
See application file for complete search history.

(56) References Cited

U.S. PATENT DOCUMENTS

| 6,446,145 B1 * | 9/2002 | Har et al. ............... 710/68 |
| 7,440,473 B2 * | 10/2008 | Kim et al. ............ 370/469 |
| 2006/1021262 * | 9/2006 | Nakagawa et al. ....... 710/68 |

OTHER PUBLICATIONS

J.-M. Cheng, et al., "A Fast, Highly Reliable Data Compression Chip and Algorithm for Storage System", IBM J. Res. Develop. vol. 40, No. 6—Nov. 1996 [0018-8646/96] (pp. 603-613).

* cited by examiner

*Primary Examiner*—Alford W Kindred
*Assistant Examiner*—Richard Franklin
(74) *Attorney, Agent, or Firm*—Christopher K. Gagne

(57) ABSTRACT

A write request is received from a host, to write data from memory to storage. The request indicates whether or not to compress the data. The data is either compressed or not compressed, as indicated by the request, prior to sending the data to the storage. Other embodiments are also disclosed and claimed.

14 Claims, 5 Drawing Sheets ered to the same embodiment, and they mean at least one.
DATA STORAGE USING COMPRESSION An embodiment of the invention is directed to the use of compression in data storage. Other embodiments are also described and claimed.

BACKGROUND

Data compression allows more efficient use of storage media and communication bandwidth. Adding compression technology may help lower the cost of a storage system, without changing the application layer or other higher layer data access methods. Typical compression offerings for tape storage have been available for several years. More recently, there has been a desire to extend these cost and performance benefits to higher data rate media such as magnetic rotating disk storage. The addition of compression capability to a disk subsystem may help make more efficient use of resources such as cache, data path bandwidth, and disk capacity in a manner that is transparent to the higher layer which seeks to have its data stored. If the data are compressed as they enter the storage subsystem, cache resources in the subsystem may be more efficiently used.

However, the compression and decompression of data performed between the host or processor of a system and its storage units reduces read and write performance. To alleviate this performance penalty, dedicated high performance compression chips may be developed that respond quickly and provide relatively high throughput. Although such a solution may be appropriate for a system in which the host is in a mainframe computer or engineering work station, it is prohibitively expensive for lower cost, personal computer (PC) and server systems such as those based on the IA32 instruction set architecture and computing platform by Intel Corp. of Santa Clara, Calif.

BRIEF DESCRIPTION OF THE DRAWINGS

The embodiments of the invention are illustrated by way of example and not by way of limitation in the figures of the accompanying drawings in which like references indicate similar elements. It should be noted that references to "an" embodiment of the invention in this disclosure are not necessarily to the same embodiment, and they mean at least one.

DETAILED DESCRIPTION

Figure 1:
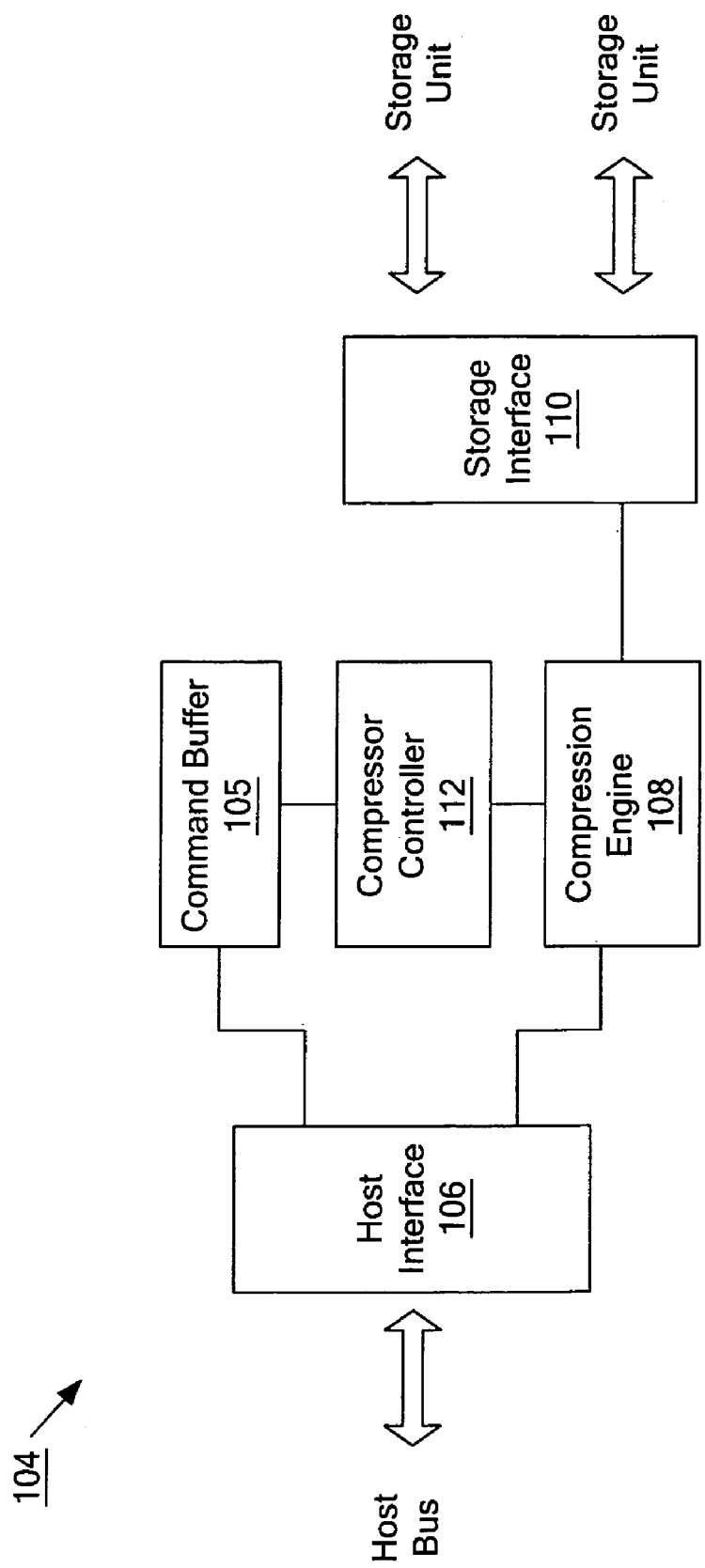
FIG. 1 shows a block diagram of a storage controller according to an embodiment of the invention.

The embodiments of the invention described below make efficient use of compression capabilities in a storage system. Beginning with FIG. 1, a conceptual block diagram of a storage controller 104 is shown in accordance with an embodiment of the invention. The host interface 106 is coupled to a host bus (e.g., a host processor bus, not shown) over which read and write requests to access a storage subsystem are received. The host interface 106 may include hardware such as connectors and circuitry that transmit, receive and translate signals between on-chip logic that is part of the storage controller 104 and transmission line signals on the host bus (not shown). The host bus may be a parallel, multi-drop, or serial bus over which a processor or memory can communicate with other components of a computer system (e.g., a system interface chipset). The term "host" here refers to a processor or a system interface chipset of a system that can issue read and/or write transactions to storage in the system. The system may be a general purpose computer system such as a PC (e.g., a notebook computer; a desktop computer), or a server, or it may be a dedicated machine such as a video game console, a television set top box, or a personal video recorder (see FIG. 4 for an example).

A command buffer 105 is to store the read and write requests that have been received through the host interface 106. The buffer 105 may have a first in first out structure (queue) from which the read and write requests directed to storage are processed by the storage controller 104. The storage may include one or more storage units each of which may be a direct access storage device (e.g., a rotating magnetic disk drive unit, a rotating optical disk drive unit, and a tape drive unit). The actual storage media may be fixed, or they may be portable in some cases, from one system to another (e.g., a compact disc, CD; a digital video disk, DVD). A storage interface 110 provides the needed connectors and/or circuitry to translate between the signals in a storage unit bus and on-chip logic signaling within the storage controller 104.

The storage controller 104 features a compression engine 108 that is coupled between the host interface 106 and the storage interface 110. An input is to receive write data through the host interface 106, and an output is to send compressed data to the storage interface 110. The received write data can be compressed in accordance with any one of several known data compression methodologies suitable for storage of data. A compressor controller 112 has an input coupled to the command buffer 104. The compressor controller 112 is coupled to the compression engine 108, to selectively turn on and turn off compression of data being sent to a location in a storage unit. The controller 112 may also request the compression engine to change the type of compression it performs on the write data, based on the incoming write requests in the command buffer 105. This helps make more efficient use of the compression engine 108, in accordance with compression needs that have been determined by the host. Advantageously, any compression methodology that has been specified is to be performed not by the host, but rather the storage controller or host disk adapter 408 (also referred to as a host bus adapter) in this case, thereby freeing host resources for other tasks. This type of host inline compression also makes more efficient use of the storage units and any busses or data paths in the storage subsystem, as less data is read from and written to the storage unit. Increasing the available I/O channel bandwidth, between the storage controller 104 and the storage units, helps the system support additional storage units. This may also help reduce the effective transfer time of the data, from the host to the storage units.

Virtually any type of storage unit may be used, for example rotating magnetic or optical disk drive units, tape drive units, other types of nonvolatile drive units and solid state disks. A wide range of different types of storage interfaces 110 may also be used. Example storage interfaces 110 include those that comply with the interface or protocol described in American National Standards Institute (ANSI) Small Computer Systems Interface-2 (SCSI-2) ANSI X3.131-1994; ANSI Standard Fibre Channel (FC) Physical Signaling Interface-3 X3.303:1998 Specification; and Serial ATA: High Speed Serialized AT Attachment, revision 1.0 published Aug. 29, 2001 by the serial ATA Working Group.

Figures 2, 3:
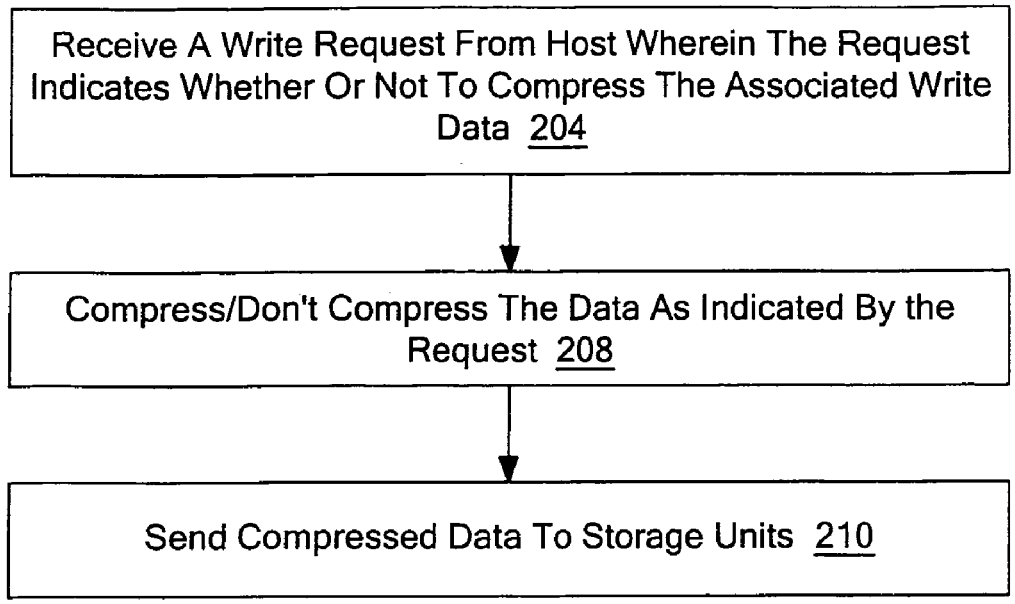
FIG. 2 is a flow diagram of operations that may be performed by a storage controller or host disk adapter.
FIG. 3 conceptually shows a data structure for a write request from the host, according to an embodiment of the invention.

Referring now to FIG. 2, a flow diagram of operations performed by a storage controller in accordance with an embodiment of the invention are shown. In operation 204, a write request is received from the host, where the request indicates whether or not to compress the associated write data. As suggested above, such a write request may be in the form of a write transaction issued by a host component (e.g., the processor or system chipset), and received through the host interface 106 (FIG. 1). The request is stored in the command buffer 105 of the storage controller until it is ready to be processed to generate the output compressed data through the storage interface 110. FIG. 3 shows an example write request data structure 302, received from the host. The data structure has a logical address field 304 that specifies or allows the storage controller to resolve the system level address in which the write data is to be stored. The write data itself my arrive within a write data field 308. In most instances, the write data arrives from memory and is destined to storage.

The data structure 302 also includes a compression control (CC) field 306, which indicates the wishes of the host as to whether or not to compress the associated write data (in the write data field 308). The storage controller thus proceeds to either compress or not compress the write data, as indicated by the request and in particular in the CC field 306 (operation 208). The compressed data is then sent to one or more storage units, via the storage interface 110 (operation 210). In addition to the compressed data, the storage controller may also send the logical address associated with the compressed data through the storage interface 110. When a storage unit receives the logical address, it performs a translation into a physical address of where the compressed data will be stored in the storage unit. For example, the logical address may be a logical block address (LBA) for disk storage, where the LBA is then translated into cylinder, head, and sector numbers in the disk drive unit. Other types of translations between the logical address (system level) and the physical address (storage unit) are possible.

Figure 4:
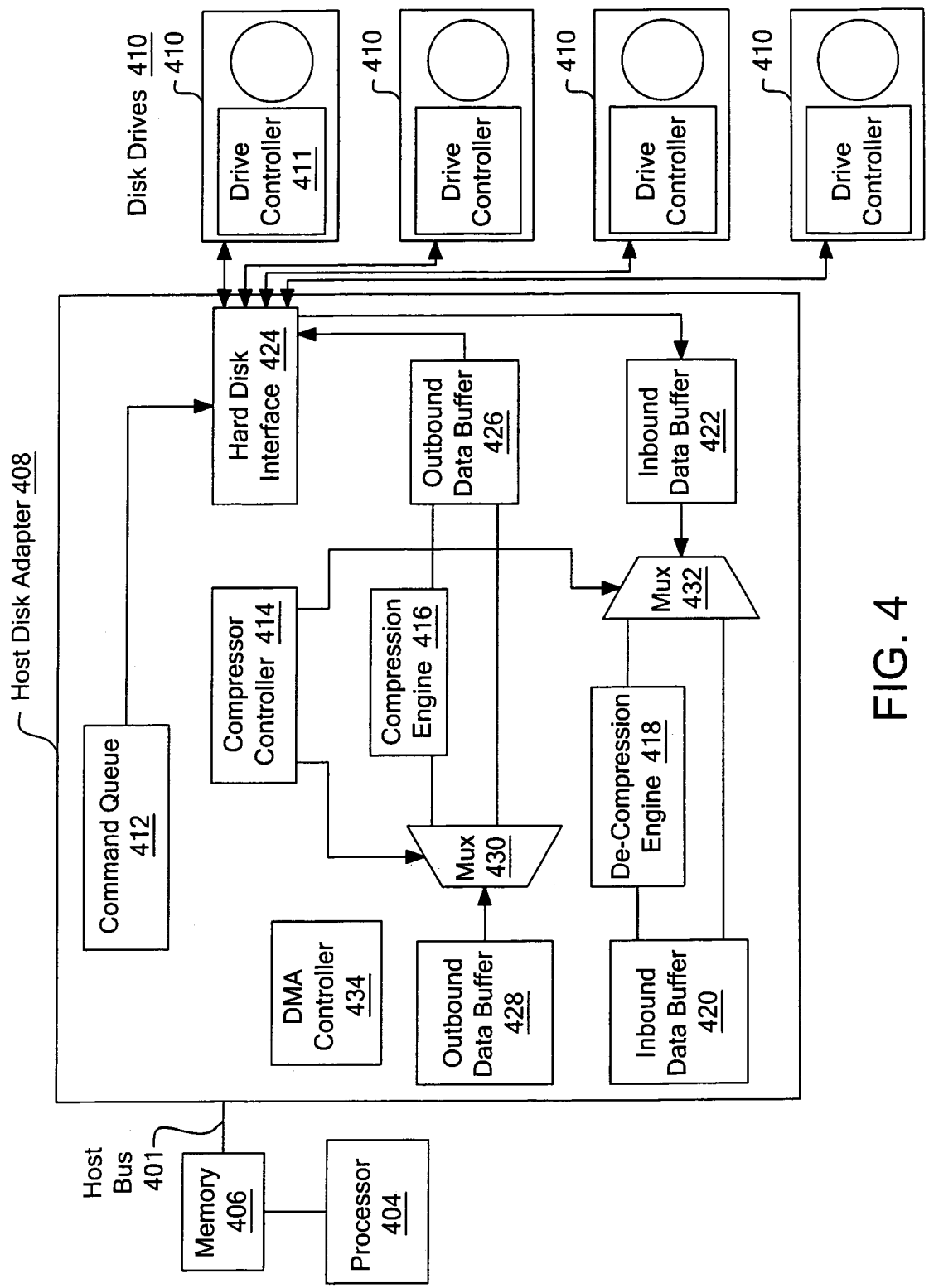
FIG. 4 is a block diagram of a computer system having a host disk adapter according to an embodiment of the invention.

Turning now to FIG. 4, a block diagram of computer system having a host disk adapter in accordance with an embodiment of the invention is shown. The host disk adapter 408 may be a circuit card (also referred to as an add-in card) that has connectors (not shown) which connect to a mating connector to a host bus 401. The connection may be serial or it may be parallel, multi-drop (where in that case the host bus 401 is fitted with multiple slots to receive multiple add in cards, respectively). As another alternative the host disk adapter 408 may be entirely integrated into the mother board or baseboard of the system. The system has multiple, storage units (here disk drives 410 each having a separate drive controller 411) that communicate with the host disk adapter 408 via a hard disk interface 424 of the latter. As suggested above, this hard disk interface 424 may comply with any one of a number of known storage interfaces or protocols.

On the host side, the system has a processor 404 (here also referred to as a host processor) that is coupled to a memory 406 (also referred to as main memory that may include dynamic random access memory, DRAM, for storing an operating system program and one or more application programs), to execute instructions stored therein. These instructions generate a number of write requests to the storage subsystem (including disk drives 410). In this case, each write request indicates a LBA for its respective write data. In addition, each write request indicates whether or not to compress its respective write data, or alternatively the type of compression to apply. This allows the host even finer grain control over the process of data storage. For example, the data that is sent to storage may be part of a previously compressed, movie file (e.g., motion picture experts group, MPEG, format). In that case, further compression of the data by a particular algorithm that is implemented in the compression engine (see FIG. 1) would not outweigh the increase in latency and/or throughput associated with applying inline compression prior to storage. The host may indicate in such a request that no compression be applied.

In other cases, it may be beneficial to apply a relatively small amount of compression to the write data, using a particular compression methodology, but not another. In that case, the host would indicate the particular type of compression to apply to the associated write data. For example, if the write data is mostly text, as opposed to a graphical image, then a lossless compression scheme (e.g., run length encoding) should be selected. The storage controller may have the capability (in its compression engine) to perform several different types of compression, or simply no compression at all, and is thus said to selectively compress the write data associated with a write request.

Figure 5:
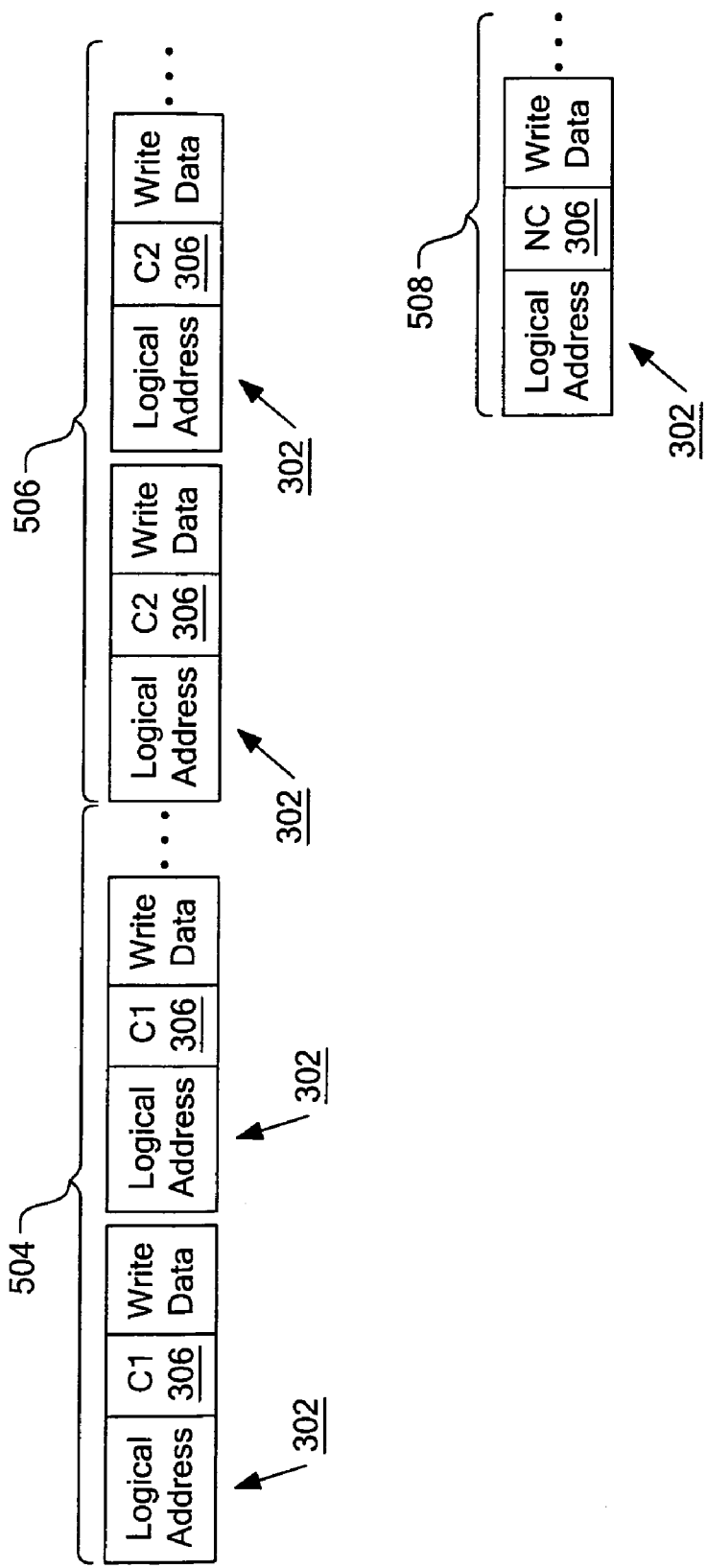
FIG. 5 shows a number of write request sequences from a host to a storage subsystem, according to an embodiment of the invention.

In FIG. 5, a number of write request sequences 504, 506, and 508 from a host to a storage subsystem are depicted, according to an embodiment of the invention. These sequences could appear on the host bus 401 (see FIG. 4) traveling from the host (processor 404 and memory 406) to the host disk adapter 408. Each sequence has one or more write requests where each write request in this example is represented by a separate data structure 302. Each instance of the data structure 302 includes a logical address field, a compression control field 306, and a payload data field. For sequence 504, the host has determined that the associated write data is best serviced for storage by being compressed, in accordance with data compression methodology C1. In contrast, the host has determined that for sequence 506, a different compression methodology C2 should be applied. Finally, the host has determined that sequence 508 is best served by applying no data compression, between the host and the storage units, thereby filling the field 306 with a no compression (NC) flag.

Still referring to FIG. 4, example data paths for write data are shown. Data from the host, over host bus 401 and arriving at the host disk adapter 408, is stored in an outbound data buffer 428, before being sent under control of a compressor controller 414, to either the compression engine 416 or, bypassing compression, directly to an outbound data buffer 426. A multiplexer 430 is provided to achieve this function, under control of the compressor controller 414. The selection is made based on write requests that have been buffered in the command queue 412. The compressed write data is provided to the hard disk interface 424 from the outbound data buffer 426, in association with a logical address from the command queue 412. These are then sent to the appropriate disk drives 410 for storage.

In addition to compression, the host disk adapter 408 may include a decompression engine 418 coupled between the host interface (not shown) and the hard disk interface 424. The decompression engine 418 includes the capability of decompressing any data that has been compressed by the compression engine 416. An input is to receive read data from the hard disk interface 424, and an output is to send decompressed data to the host. An output of the inbound data buffer 420 feeds the host bus 401, to deliver read data to the host. If the read data has not been previously compressed by the host disk adapter, then the read data from the inbound data buffer 422 can bypass the decompression engine 418 on its way to the host, and passing through the inbound data buffer 420. A multiplexer 432 helps achieve this function, once again under control of the compressor controller 414.

The compressor controller 414 may determine whether or not certain previously written data (identified by its logical address) had been selected to be compressed prior to storage, so that upon a subsequent read request for that data, the appropriate decision (whether or not to route the data through the decompression engine 418) can be made. In other words, the compressor controller 414 can selectively turn on and turn off decompression to a location in the storage unit. The controller 414 may be informed of this selection by having previously stored the compression indication, or by having received it from the storage unit along with the associated read data. Note that in cases where multiple, compression methodologies are supported in the host disk adapter 408, the compressor controller 414 should have the capability to recognize the different ones used for compressing write data, and select the appropriate decompression methodology to be applied to the read data.

The host disk adapter 408 depicted in FIG. 4 also has a direct memory access (DMA) controller 434 to obtain write data from the memory 406, prior to compressing or sending the data to the storage units. In this example, the DMA controller 434 initiates a transfer between memory 406 and the outbound data buffer 428, of the write data that has been specified in a previously received write request which has been queued in the command queue 412. The write request in that case may specify the address in memory 406 from which the write data can be read. This read transaction may be a DMA transfer that does not involve the processor 404 taking control of a bus to access the write data in the memory 406. Alternative ways of obtaining the write data from the host are possible.

Figure 6:
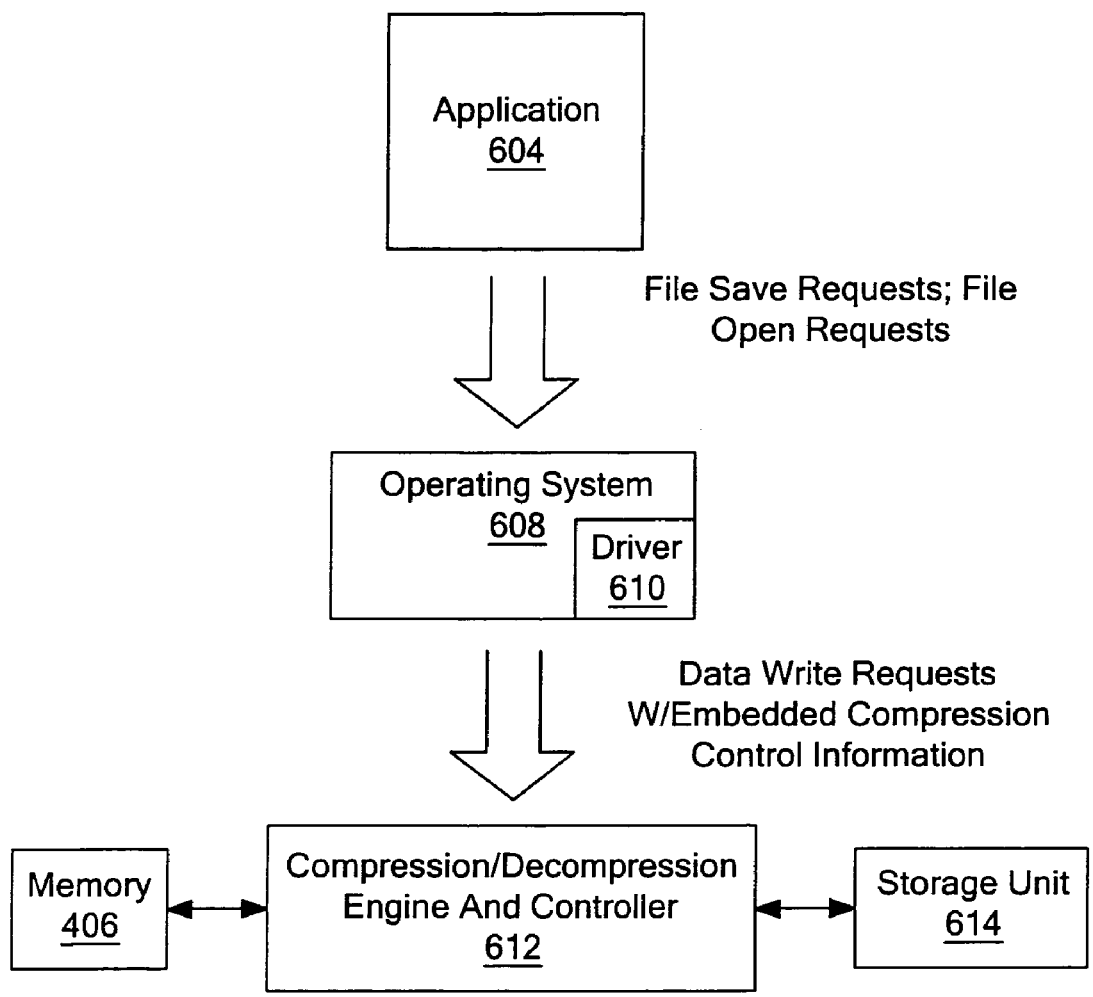
FIG. 6 is a diagram of the different layers involved in the processing of file save and file open requests according to an embodiment of the invention.

Turning now to FIG. 6, a diagram of the different layers involved in the processing of file save and file open requests according to an embodiment of the invention is shown. In this case, file save and file open requests are generated by an application 604 (e.g., an audio or video player program, a graphical image manipulation and creation program, a word processor, or a data base program). The requests are taken by an operating system 608 operating at a lower layer than the application 604. The operating system can take such requests from a number of different applications that are running in the memory 406 or in other memory in the same system. The operating system 608 is aware of the hardware resources in the system, including the storage subsystem. It uses a driver 610 that serves to interface with the lower layer hardware. The driver 610 translates the file save request into a number of requests to write data from memory to a storage unit. In addition, the driver 610 embeds compression control information into the requests. This information may indicate the type of compression to be applied by a layer below the driver 610 to the data. As an alternative, the requests may indicate whether or not any compression is to be applied, by the lower layers of the system. In this example, the lower layer includes compression/decompression engine and controller 612 that transfer data between the memory 406 and a storage unit 614 of the system. Thus, a file save is translated into one or more write requests, while a file open is translated into one or more read requests. The translated read requests from the driver 610 may also indicate either the type of decompression to be applied by the layer below the driver 610, or whether or not any decompression is to be applied by that layer. Alternatively, these read requests need not indicate any compression control information, if the lower layer has the capability to remember the type of compression that was previously applied by it to the specified data.

The driver 610 may recognize a file name extension in the file save request, and on that basis indicate the compression type, or whether any compression is to be applied, to the compression/decompression engine and controller 612. As an alternative, it may be the file system (in the operating system) that recognizes the extension and on that basis indicates the compression control information to the driver 610 (who then passes it on to the controller 612). This type of host processing relieves the application 604 of the need to make the determination regarding the type of compression to be used for data storage. For example, a particular type of audio file may be well suited for a certain type of compression, whereas mixed audio and video files may not be. The driver 610 or file system can be written to recognize the differences between those types of files, based on their extensions, and accordingly select the appropriate compression methodology for each case. As to file open requests, which translate into one or more read requests from storage, the driver 610 need not indicate the type of decompression as the lower layer (compression/decompression engine and controller 612) may be better suited to detect the fact that the data associated with a particular logical address and that has been received from the storage unit 614 is compressed. This makes the task of modifying the driver 610 to support the selective compression methodology described here a little easier.

An embodiment of the invention may be a machine readable medium having stored thereon instructions which program a processor to perform some of the operations described above, e.g. translate file save and open requests; compress and decompress data for storage. In other embodiments, some of these operations might be performed by specific hardware components that contain hardwired logic. Those operations might alternatively be performed by any combination of programmed computer components and custom hardware components.

A machine-readable medium may include any mechanism for storing or transmitting information in a form readable by a machine ((e.g., a computer), not limited to Compact Disc Read-Only Memory (CD-ROMs), Read-Only Memory (ROMs), Random Access Memory (RAM), Erasable Programmable Read-Only Memory (EPROM), and a transmission over the Internet.

The invention is not limited to the specific embodiments described above. For example, although the host capability described above for making the determination regarding the type of compression was in an operating system driver program (that may be authored by the manufacturer of the compression/decompression engine and controller 612), an alternative is to put such host capability into the basic I/O system firmware (BIOS) of the system. Accordingly, other embodiments are within the scope of the claims.

What is claimed is:

1. A storage controller comprising:
  a host interface coupled to a host, the host interface to receive at least one of a read request and a write request from the host, the write request, as received from the host by the host interface, including a write data field indicating write data to be written, an address field indicating an address to which to write the write data in a storage unit, and a compression control field, the compression control field being distinct from the address field and specifying whether or not to compress the write data, and if the write data is to be compressed, the compression control field specifying which of a plurality of compression methodologies to be applied to the write data;
a command buffer to store the read and write requests received through the host interface;
a storage interface to the storage unit;
a compression engine coupled between the host interface and the storage interface, with an input to receive the write data through the host interface and an output to send compressed data to the storage interface via a data buffer; and
a compressor controller having an input coupled to the command buffer, the compressor controller being to control a multiplexer, based upon the compression control field, so as to one of send the write data to the compression engine and send the write data to the data buffer in a way that bypasses the compression engine, the compression controller being to selectively turn on and turn off compression and to apply one of the plurality of compression methodologies, based upon the compression control field, of the write data to be sent to a location in the storage unit specified by the address;
wherein if the write data is to be compressed, a determination of which of the plurality of compression methodologies is to be applied to the write data, as specified in the compression control field, is made by BIOS firmware.

2. The storage controller of claim 1 wherein the host interface is coupled to a host processor bus, the read and write requests to be received over the host processor bus.

3. The storage controller of claim 2 wherein the host interface is further coupled to a host memory, the write data to be received from the host memory.

4. The storage controller of claim 1 further comprising:
a decompression engine coupled between the host interface and the storage interface, with an input to receive read data from the storage interface and an output to send decompressed data to the host interface, wherein the compressor controller is further coupled to the decompression engine to selectively turn on and turn off decompression applied to read data read from a read location in the storage unit.

5. The storage controller of claim 4 further comprising:
an outbound data buffer coupled between the compression engine and the storage interface, with an output to send compressed write data to the storage interface.

6. The storage controller of claim 5 further comprising:
an inbound data buffer coupled between the decompression engine and the storage interface, with an input to receive compressed read data from the storage interface.

7. The storage controller of claim 4 further comprising a direct memory access controller coupled to the host interface to access the write data.

8. The storage controller of claim 1 wherein the compressor controller is to request a change in the type of compression performed by the compression engine.

9. A method for data storage, comprising:
receiving at a host interface a write request from a host to write data from memory to storage, wherein the request, as received by the host interface, including a write data field indicating write data to be written, an address field indicating an address to which to write the write data in the storage, and a compression control field that is distinct from the address field, the compression control field specifying whether or not to compress the write data, and if the write data is to be compressed, the compression control field specifying which of a plurality of compression methodologies to be applied to the write data; and
controlling a multiplexer, based upon the compression control field, so as to one of send the write data to a compression engine and send the write data to the storage in a way that bypasses the compression engine, so as to perform one of compressing by the compression engine and not compressing the data, as indicated by the compression control field in said request, prior to sending the write data to a location in the storage indicated by the address;
wherein if the write data is to be compressed, a determination of which of the plurality of compression methodologies is to be applied to the write data, as specified in the compression control field, is made by BIOS firmware.

10. The method of claim 9 wherein the address indicates a logical address.

11. The method of claim 10 wherein the logical address is a logical block address (LBA) for disk storage.

12. The method of claim 9 wherein the write data field contains the write data.

13. The method of claim 9 further comprising performing a direct memory access (DMA) to obtain the data from the memory, prior to compressing or sending the data.

14. The method of claim 13 wherein the request indicates to compress the data, the method further comprising:
receiving another write request from the host to write further data from the memory to the storage, said another write request indicating a different way to compress the further data; and
compressing the further data, as indicated by said another write request, prior to sending the further data to the storage.

* * * * *